2,913,466
Patented Nov. 17, 1959

2,913,466

3,11,20-TRIOXYGENATED 16-NITROMETHYL-PREGNENE DERIVATIVES

Raymond M. Dodson, Park Ridge, Ill., assignor to G. D. Searle & Co., Chicago, Ill., a corporation of Delaware No Drawing. Application June 7, 1957
Serial No. 664,182

3 Claims. (Cl. 260—397.3)

The present invention is concerned with steroidal nitro compounds, and, more particularly, with 16-nitromethyl substitution products of pregnane derivatives oxygenated at positions 3, 11, and 20. The compounds of the present invention can be represented by the structural formula

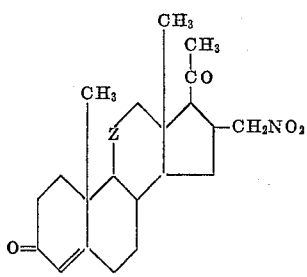

wherein Z can represent the carbonyl group (CO) or the hydroxymethylene group (CHOH).

Compounds of the present invention can be manufactured by the base-catalyzed reaction of nitromethane with 4,16-pregnadiene-3,11,20-trione or with an 11-hydroxy-4,16-pregnadiene-3,20-dione. Among the basic catalysts satisfactory for use in conducting this reaction are piperidine, alkylated piperidines, and lower-trialkylamines. When the reaction is carried out with such a catalyst, using an excess of nitromethane as the solvent, substantial conversion to the desired products is achieved after reaction periods of up to about five days at room temperature. The reactions which occur include the addition of nitromethane to the 16-double bond, as well as the further reaction of the steroidal starting material with a total of three molecular equivalents of nitromethane. As illustrated in greater detail hereinafter, each of these products can be isolated from the reaction mixture in representative examples of this invention.

The compounds of this invention have useful pharmacological properties. Specifically, they are anti-hypertensive agents, effective in reducing abnormally elevated blood pressures.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.) and quantities of materials in parts by weight.

Example 1

A solution of 1 part of 4,16-pregnadiene-3,11,20-trione, 11.5 parts of nitromethane and 2 parts of piperidine is maintained at about 25° C. for 5 days. The contents of the reaction vessel are poured into a solution of 10 parts of potassium hydroxide in 100 parts of ice water, and the mixture is extracted with mixtures of ether and ethyl acetate. The separated organic phase is washed twice with 5% potassium hydroxide solution, with water, with dilute hydrochloric acid, and finally with water. The organic phase is then rendered anhydrous over sodium sulfate, filtered, and brought to dryness by vaporization of the solvents. A solution of the residue in benzene is poured onto a chromatography column prepared from 50 parts of silica, and the column is eluted with mixtures of benzene and ethyl acetate containing gradually increasing proportions of ethyl acetate. Two principal weight peaks, corresponding to the two principal products of the reaction, appear in the elution sequence. The first of these products is removed from the column at a satisfactory rate by elution with a 10 volume percent solution of ethyl acetate in benzene. Upon concentration of the eluates and recrystallization of the residues from dilute acetone, the compound obtained has the empirical formula $C_{24}H_{33}N_3O_8$ and melts at about 229–230° C.

The second product corresponding to a principal weight peak is eluted from the column at a satisfactory rate with a 20 or 25 volume percent solution of ethyl acetate in benzene. Upon concentration of the eluates and recrystallization of the residues from a mixture of acetone and cyclohexane and then from dilute acetone, the compound obtained is 16-nitromethyl-4-pregnene-3,11,20-trione which melts at about 206.5–208.5° C. and has a specific rotation of about +229° in chloroform solution. The structural formula is

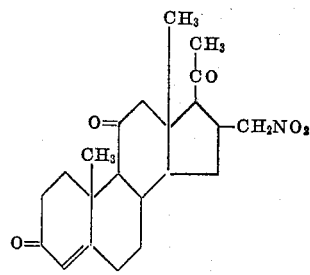

Example 2

A solution prepared from 3 parts of 11α-hydroxy-4,16-pregnadiene-3,20-dione, 35 parts of nitromethane and 5 parts of piperidine is allowed to stand at about 25° C. for 5 days. The reaction mixture is poured into 300 parts of ice cold 10% potassium hydroxide solution, and the resulting suspension is extracted with mixtures of ether and ethyl acetate. The organic phase is separated and washed with dilute potassium hydroxide solution, with water, with dilute hydrochloric acid, and finally with several portions of water. It is then rendered anhydrous, filtered, and distilled to dryness under reduced pressure. A solution of the residue in benzene is poured onto a chromatography column prepared from 150 parts of silica, and the column is eluted with mixtures of benzene and ethyl acetate containing gradually increasing proportions of ethyl acetate. By this procedure there are successively eluted from the column a compound of empirical formula $C_{24}H_{35}N_3O_8$, formed by the reaction of three moles of nitromethane with one mole of 11α-hydroxy-4,16-pregnadiene-3,20-dione, followed by 11α-hydroxy-16-nitromethyl-4-pregnene-3,20-dione. The latter compound exhibits an ultraviolet absorption maximum at about 241 millimicrons, and infrared absorption maxima at about 2.93, 5.86, 6.00, 6.21, and 6.47 microns. The structural formula is

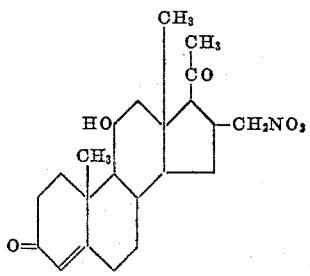

What is claimed is:

1. A compound of the structural formula

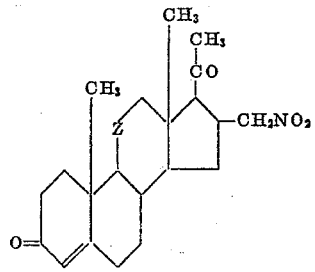

wherein Z is a member of the class consisting of the carbonyl group and the hydroxymethylene group.

2. 16-nitromethyl-4-pregnene-3,11,20-trione.

3. 11α-hydroxy-16-nitromethyl-4-pregnene-3,20-dione.

References Cited in the file of this patent

UNITED STATES PATENTS

| | | |
|---|---|---|
| 2,666,016 | Hechter | Jan. 12, 1954 |
| 2,695,260 | Murray | Nov. 23, 1954 |
| 2,697,109 | Dodson | Dec. 14, 1954 |
| 2,727,908 | Dodson | Dec. 20, 1955 |
| 2,794,815 | Dodson | June 4, 1957 |